US012713500B2

(12) United States Patent
Wen et al.

(10) Patent No.: US 12,713,500 B2
(45) Date of Patent: Aug. 18, 2026

(54) ENHANCED BLIND RETRANSMISISON SCHEME

(71) Applicant: Nokia Technologies Oy, Espoo (FI)

(72) Inventors: Pingping Wen, Shanghai (CN); Ping Yuan, Beijing (CN)

(73) Assignee: Nokia Technologies Oy, Espoo (FI)

( * ) Notice: Subject to any disclaimer, the term of this patent is extended or adjusted under 35 U.S.C. 154(b) by 253 days.

(21) Appl. No.: 18/720,431

(22) PCT Filed: Dec. 16, 2021

(86) PCT No.: PCT/CN2021/138622
§ 371 (c)(1),
(2) Date: Jun. 14, 2024

(87) PCT Pub. No.: WO2023/108516
PCT Pub. Date: Jun. 22, 2023

(65) Prior Publication Data
US 2025/0089098 A1 Mar. 13, 2025

(51) Int. Cl.
*H04W 76/38* (2018.01)
*H04W 72/115* (2023.01)
*H04W 74/0833* (2024.01)

(52) U.S. Cl.
CPC .......... *H04W 76/38* (2018.02); *H04W 72/115* (2023.01); *H04W 74/0833* (2013.01)

(58) Field of Classification Search
CPC ........... H04W 74/0833; H04W 74/002; H04W 72/23; H04W 56/001; H04W 72/115; H04W 76/38
See application file for complete search history.

(56) References Cited

U.S. PATENT DOCUMENTS

2022/0217790 A1* 7/2022 Qiu ..................... H04W 56/005
2023/0084692 A1* 3/2023 Luo ...................... H04B 7/2612

FOREIGN PATENT DOCUMENTS

WO WO-2024248834 A2 * 12/2024 .............. H04W 4/50

* cited by examiner

*Primary Examiner* — Sulaiman Nooristany
(74) *Attorney, Agent, or Firm* — Barta Jones, PLLC

(57) ABSTRACT

Embodiments of the present disclosure relate to devices, methods, apparatuses and computer readable storage media of enhanced blind retransmission scheme. The method comprises: receiving, at a first device and from a second device, a configuration for determining a target offset associated with a contention resolution timer for a random access procedure; determining the target offset based on the configuration; transmitting, to the second device, a message associated with the random access procedure, the message comprising an identity of the first device for random access; and controlling a starting and termination of the contention resolution timer based on the target offset and the transmission of the message. In this way, the blind retransmission of MSG3 can be supported in the random access procedure through controlling a starting and termination of the contention resolution timer based on the transmission of the message and an offset, which is beneficial to the NTN.

20 Claims, 8 Drawing Sheets

402

404

ENHANCED BLIND RETRANSMISISON SCHEME

FIELD

Embodiments of the present disclosure generally relate to the field of telecommunication and in particular to devices, methods, apparatuses and computer readable storage media of enhanced blind retransmission scheme.

BACKGROUND

In non-terrestrial networks (NTNs), the network may configure an uplink (UL) HARQ retransmission state for a HARQ process and LCH considering delay and reliability characteristics of ongoing services. Typically, there are two Hybrid Automatic Repeat reQuest (HARQ) states defined for UL dynamic grants in a HARQ process, that is, HARQ state A and HARQ state B. HARQ A supports reception of UL retransmission grant(s) based on UL decoding results, while HARQ state B supports no UL retransmission and/or blind UL retransmission. Blind UL retransmission is an efficient scheduling and retransmission scheme, which not only makes use of the time-diversity to improve the reliability, but also provides a good latency gain and scheduling freedom, especially in the GEO case.

Correspondingly, the discontinuous reception (DRX) behaviours are also modified to support different UL retransmission states. In particular, the length of drx-HARQ-RTT-TimerUL is extended by the round trip time (RTT) associated with a UE and a gNB (which may be also referred to as the UE-gNB RTT) for HARQ state A, that is, PDCCH (physical downlink control channel) monitoring is optimized to support UL retransmission grant based on UL decoding result. In addition, the drx-HARQ-RTT-TimerUL is not started for HARQ state B, and how to support blind retransmission for at least one HARQ process configured with HARQ state B is under discussion.

SUMMARY

In general, example embodiments of the present disclosure provide a solution of blind retransmission.

In a first aspect, there is provided a first device. The first device comprises at least one processor; and at least one memory including computer program codes; the at least one memory and the computer program codes are configured to, with the at least one processor, cause the first device at least to: receive, from a second device, a configuration for determining a target offset associated with a contention resolution timer for a random access procedure; determine the target offset based on the configuration; transmit, to the second device, a message associated with the random access procedure, the message comprising an identity of the first device for random access; and control a starting and termination of the contention resolution timer based on the target offset and the transmission of the message.

In a second aspect, there is provided a second device. The second device comprises at least one processor; and at least one memory including computer program codes; the at least one memory and the computer program codes are configured to, with the at least one processor, cause the second device at least to: transmit, to a first device, a configuration for determining a target offset associated with a contention resolution timer for a random access procedure; receive, from the first device, a message associated with the random access procedure, the message comprising an identity of the first device for contention based random access; and cause the first device to control a starting and termination of the contention resolution timer based on the target offset and the transmission of the message.

In a third aspect, there is provided a method. The method comprises: receiving, at a first device and from a second device, a configuration for determining a target offset associated with a contention resolution timer for a random access procedure; determining the target offset based on the configuration; transmitting, to the second device, a message associated with the random access procedure, the message comprising an identity of the first device for random access; and controlling a starting and termination of the contention resolution timer based on the target offset and the transmission of the message.

In a fourth aspect, there is provided a method. The method comprises: transmitting, at a second device and to a first device, a configuration for determining a target offset associated with a contention resolution timer for a random access procedure; receiving, from the first device, a message associated with the random access procedure, the message comprising an identity of the first device for contention based random access; and causing the first device to control a starting and termination of the contention resolution timer based on the target offset and the transmission of the message.

In a fifth aspect, there is provided a first apparatus comprising: means for receiving, from a second apparatus, a configuration for determining a target offset associated with a contention resolution timer for a random access procedure; means for determining the target offset based on the configuration; means for transmitting, to the second apparatus, a message associated with the random access procedure, the message comprising an identity of the first apparatus for random access; and means for controlling a starting and termination of the contention resolution timer based on the target offset and the transmission of the message.

In a sixth aspect, there is provided a second apparatus comprising: means for transmitting, to a first apparatus, a configuration for determining a target offset associated with a contention resolution timer for a random access procedure; means for receiving, from the first apparatus, a message associated with the random access procedure, the message comprising an identity of the first apparatus for contention based random access; and means for causing the first apparatus to control a starting and termination of the contention resolution timer based on the target offset and the transmission of the message.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
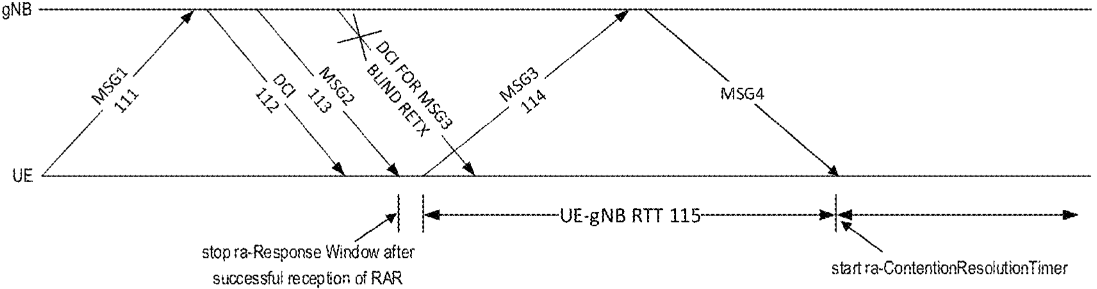
FIG. 1 illustrates an example of random access contention procedure.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements. These elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as the sixth generation (6G) systems, the fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), Integrated Access and Backhaul (IAB) node, a relay, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

During a 4-step contention-based random access (CBRA) procedure, a data transmission on PUSCH (physical uplink shared channel), i.e., a Message 3 (MSG3), may be dynamically scheduled by a random access response (RAR). On the other hand, for a 4-step contention free random access (CFRA) procedure, the RAR is used for scheduling a normal transmission on PUSCH. It has been agreed that once the MSG3 is transmitted, the ra-ContentionResolutionTimer is started, and the ra-ContentionResolutionTimer is restarted at each HARQ retransmission in the first symbol after the end of the MSG3 transmission. In addition, the UE shall monitor the PDCCH (physical downlink control channel) during the ra-ContentionResolutionTimer is running regardless of the possible occurrence of a measurement gap.

Considering the long RTT (round trip time) in NTN, an offset is introduced for the start of the ra-ContentionResolutionTimer, and the start of the ra-ContentionResolutionTimer may be delayed by the round trip time associated with the UE and the gNB estimated by the UE (i.e., the sum of UE's TA and k_mac), which may be also referred to as UE-gNB RTT. FIG. 1 illustrates an example of random access contention procedure 100. As shown in FIG. 1, the UE transmits the Random Access Preamble, i.e., MSG1 111, to the gNB. Upon detection of MSG1 111, the gNB transmits DCI 112 (downlink control information) for scheduling grant for RAR, i.e., MSG2 to the UE. The gNB may then transmit MSG2 113 containing a Random Access Preamble identifier that matches the PREAMBLE_INDEX of the transmitted preamble to the UE. The UE may stop the ra-ResponseWindow after successful reception of MSG2 and will not monitor PDCCH in the duration of UE-gNB RTT 115 after transmitting MSG 3 114. However, UE-gNB RTT 115 may be very long for NTN, in this case, blind scheduling of MSG3 retransmissions is not supported. Therefore, there is a need for an enhanced blind retransmission scheme which controls the ra-ContentionResolutionTimer to support the blind retransmission of MSG3.

Figure 2:
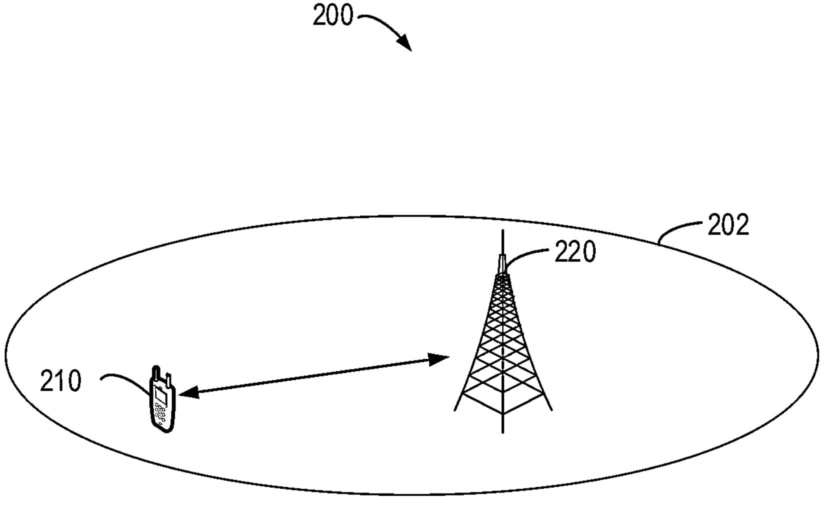
FIG. 2 illustrates an example environment in which example embodiments of the present disclosure can be implemented.

FIG. 2 shows an example communication network 200 in which embodiments of the present disclosure can be implemented. As shown in FIG. 2, the communication network 200 may comprise a first device 210 and a second device 220. The first device 210 may be a terminal device, such as, a UE (hereinafter may also be referred to as a UE 210 or a terminal device 210). The second device 220 may be a network deice, such as, a gNB (hereinafter may also be referred to as a gNB 220 or a network device 220). The communication network 200 may be an NTN, and in this case, the second device 220 or a segment of the second device 220 can be considered as being located in a satellite.

The second device 220 may provide radio coverage in a cell 202. The first device 210 and the second device 220 can communicate with each other in the coverage of the cell 202 via a UL or DL channel. In particular, the direction from the first device 210 to the second device 220 may refer to UL, and the direction from the second device 220 to the first device 210 may refer to DL.

It is to be understood that the number of network devices and terminal devices shown in FIG. 2 is given only for illustrative purpose without suggesting any limitations. The communication network 200 may include any suitable number of network devices and terminal devices. The present disclosure is not limited in this regard.

The solution of the present disclosure provides a blind retransmission scheme for random access contention. In this solution, the network can control the time for UE to start the ra-ContentionResolutionTimer to receive RAR and DCI for MSG3 transmission and blind retransmission (ReTx). The Network may configure one or more offsets to the UE and indicate an actual offset value through the offset index in a corresponding signaling (e.g., RAR, DCI for scheduling the RAR, DCI for scheduling MSG3 ReTx and so on). The UE can delay the start of ra-ContentionResolutionTimer by the configured or indicated offset after the transmission/retransmission of MSG3. If the UE receives DCI for scheduling MSG3 ReTx and accordingly retransmits MSG3, the UE will terminate the ra-ContentionResolutionTimer after the retransmission of MSG3 and restart the ra-ContentionResolutionTimer after the configured or indicated offset. In this way, the blind retransmission of MSG3 can be supported in NTN.

Figure 3:
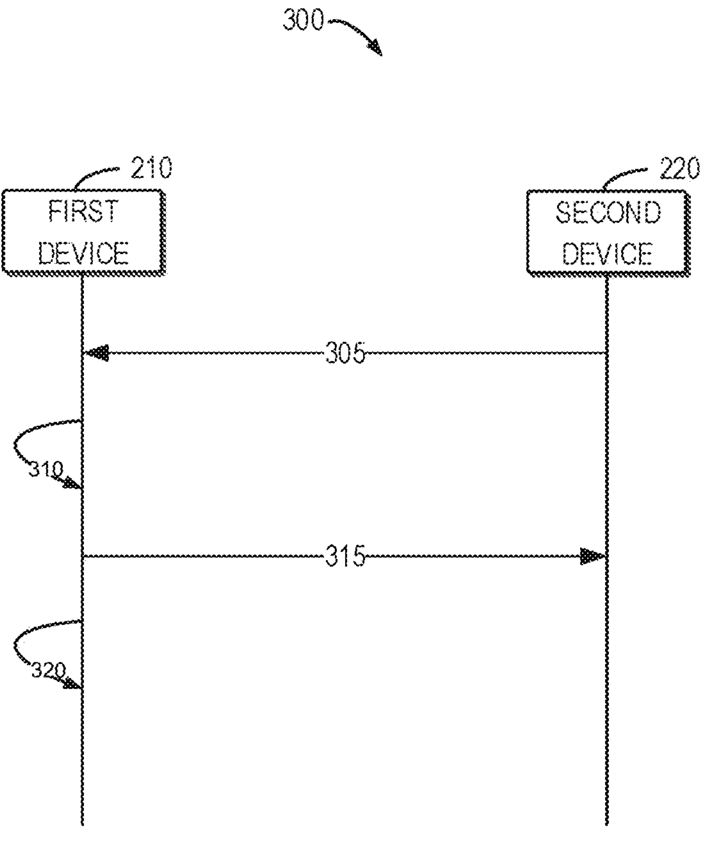
FIG. 3 shows a signaling chart illustrating a process of contention resolution for the NTN according to some example embodiments of the present disclosure.

Principle and implementations of the present disclosure will be described in detail below with reference to FIG. 3, which FIG. 3 shows a signaling chart illustrating a process 300 of contention resolution in the NTN according to some example embodiments of the present disclosure. For the purpose of discussion, the process 300 will be described with reference to FIG. 2. The process 300 may involve the first device 210 and the second 220.

The first device 210 receives, from the second device 220, a configuration for determining a target offset associated with a contention resolution timer for a RA procedure. By way of example, if MSG3 transmission is configured with blind retransmission in HARQ state B, the network may provide the configuration to the UE.

The contention resolution timer may be, for example, the ra-ContentionResolutionTimer associated with MSG3 blind retransmission. In particular, the configuration may indicate the target offset, that is, in this case, the network only configures a single offset to the UE. Alternatively, the configuration may include a set of candidate offsets. Accordingly, the configuration may be contained in a RRC message, or system information block (SIB) signaling received from the second device 220.

The first device 210 determines 310 the target offset based on the configuration. In particular, in a case where the configuration indicates one offset, the first device 210 may determine the actual offset value of the target offset directly.

In a case where the configuration includes a set of candidate offsets, the first device 210 may receive an indication of an offset index associated with the actual offset value from the second device 220, and determine the target offset from the set of candidate offsets based on the offset index. By way of example, the indication may be contained in the RAR for scheduling an initial transmission of MSG3, DCI for scheduling grant for the RAR, DCI for scheduling grant for a retransmission of MSG3 and so on.

Upon receipt the DCI for MSG3, the first device 210 transmits 315, to the second device 220, MGS3 containing an identity of the first device 210 for random access. The first device 210 controls 320 a starting and termination of the contention resolution timer based on the target offset and the transmission of MSG3, which will be described in details with reference to FIGS. 4A to 4D.

Figure 4A:
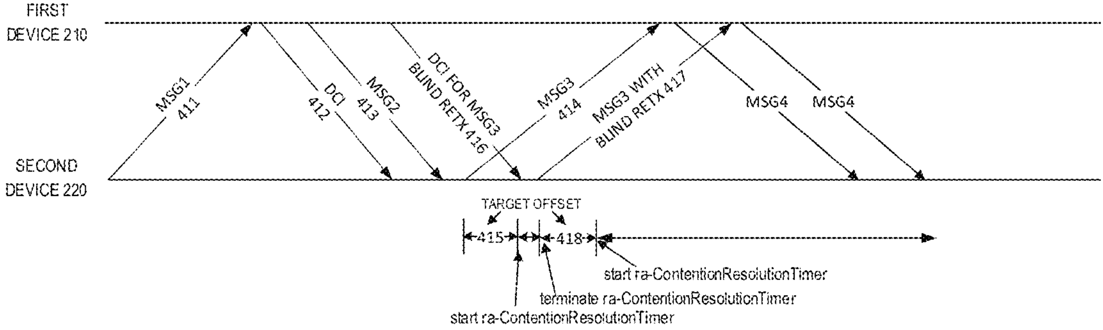
FIGS. 4A to 4D illustrate example contention resolution procedures in the NTN according to some example embodiments of the present disclosure.

Now the reference is made to FIG. 4A that illustrates an example contention resolution procedure 401 in the NTN according to some example embodiments of the present disclosure. In the procedure 401, the second device 220 may either configure a single offset or configure a set of candidate offsets, and the first device 210 determines the target offset accordingly.

At 411, the first device 210 transmits MSG1 to the second device 220. As a response, the first device 210 receives DCI for scheduling grant for MSG2 (i.e., the RAR) at 412, and then at 413 receives MSG2 from the second device 220.

When the first device 210 receives MSG2 and transmits MSG3 with new transmission (which may be also referred to as initial transmission hereinafter), the start of the ra-ContentionResolutionTimer will be delay by the target offset. As shown in FIG. 4A, the first device 210 transmits an initial transmission of MSG3 at 414, and start the ra-ContentionResolutionTimer after the target offset 415 from the transmission of MSG 3. Thus, the first device 210 can monitor PDCCH for blind retransmission during the ra-ContentionResolutionTimer is running.

During the ra-ContentionResolutionTimer is running, if the first device 210 receives DCI for scheduling grant for blind retransmission of MSG3 at 416, the first device 210 may retransmit MSG3 with blind retransmission at 417, while terminate the ra-ContentionResolutionTimer. The first device 210 may start ra-ContentionResolutionTimer after the target offset 418 from the blind retransmission of MSG3.

During the running of the ra-ContentionResolutionTimer, the first device 210 may receive MSG4 from the second device 220. For the case that the network only configures one offset to the UE, if the gNB-UE RTT is large, e.g., the RTT may be 540 ms for GEO case, the ra-ContentionResolutionTimer needs to be configured with a large value for receipt of MSG4. For the case of a small offset, it will cause more power consumption.

For the case that the network configures a sets of candidate offsets to the UE, and indicate the actual offset value through the offset index in RAR, DCI for RAR or DCI for MSG3, the network is capable of indicating a large offset value for the last transmission of MSG3, which corresponds to a long offset. As such, the UE can start the ra-ContentionResolutionTimer after the long offset. In this case, it may be more flexible in terms of scheduling the blind retransmission and helpful on power reduction.

Figure 4B:
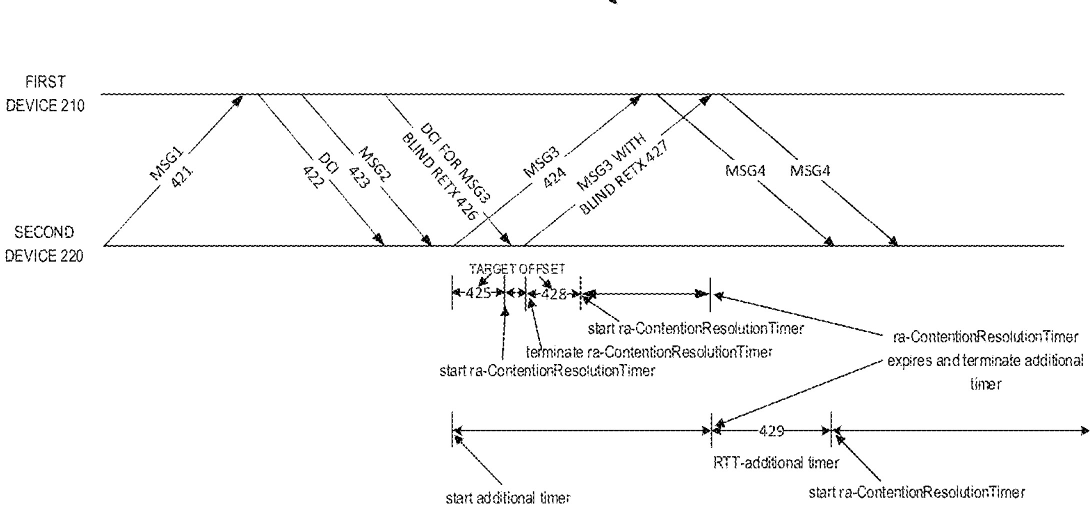

To further reduce power consumption, FIG. 4B illustrates an example contention resolution procedure 402 in the NTN according to some example embodiments of the present disclosure. In the procedure 402, the second device 220 may either configure a single offset or configure a set of candidate offsets, and the first device 210 determines the target offset accordingly. In addition, an additional timer is introduced to count the time to facilitate the start of the ra-ContentionResolutionTimer for receipt of MSG4, and the additional timer may be started after the initial transmission of MSG3.

As shown in FIG. 4B, at 421, the first device 210 transmits MSG1 to the second device 220. As a response, the first device 210 receives DCI for scheduling grant for MSG2 (i.e., the RAR) at 422, and then at 423 receives MSG2 from the second device 220. MSG2 may contain a grant for MSG3.

If MSG2 is successfully decoded, the first device 210 may transmit the initial transmission of MSG3, and the start of the ra-ContentionResolutionTimer will be delay by the target offset. As shown in FIG. 4B, the first device 210 transmits the initial transmission of MSG3 at 424, while start the addition timer. The additional timer may be, for example, smaller than the gNB-UE RTT. The duration of the additional timer may be either configured by the network or specified in relevant standards. Therefore, the present disclosure is not limited in the regards.

The first device 210 then starts the ra-ContentionResolutionTimer after the target offset 425 from the transmission of MSG 3. Thus, the first device 210 can monitor PDCCH for blind retransmission during the ra-ContentionResolutionTimer is running. During the ra-ContentionResolutionTimer is running, if the first device 210 receives DCI for scheduling grant for blind retransmission of MSG3 at 426, the first device 210 may retransmit MSG3 with blind retransmission at 427, while terminate the ra-ContentionResolutionTimer. The first device 210 may start ra-ContentionResolutionTimer after the target offset 428 from the blind retransmission of MSG3.

If there is no further DCI for retransmission of MSG3, the ra-ContentionResolutionTimer will keep running until it expires, or MSG4 is received. In a case where the ra-ContentionResolutionTimer is expired, the first device 210 starts the ra-ContentionResolutionTimer after a duration 429 of a time difference between the gNB-UE RTT and the running time of the additional timer. During the running of the ra-ContentionResolutionTimer, the first device 210 may receive MSG4 from the second device 220.

Figure 4C:
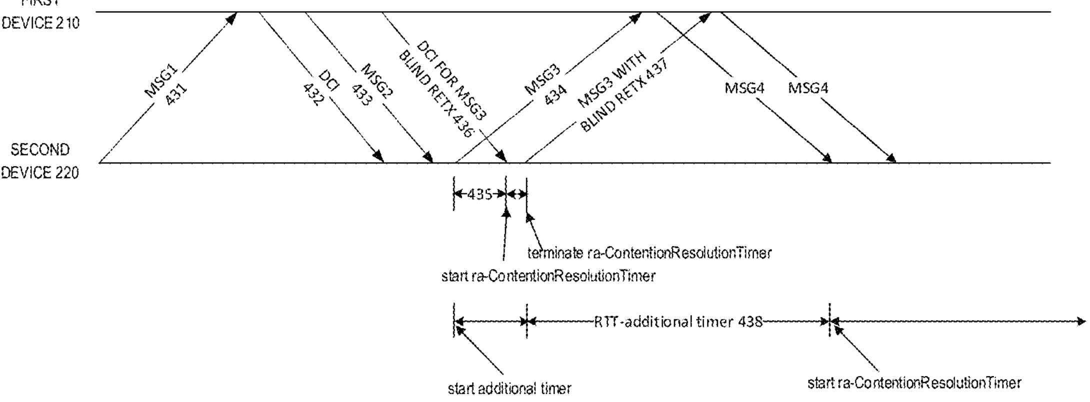

FIG. 4C illustrates an example contention resolution procedure 403 in the NTN according to some example embodiments of the present disclosure. In the procedure 403, the second device 220 may either configure a single offset or configure a set of candidate offsets, and the first device 210 determines the target offset accordingly. Similar to procedure 402, the additional timer is set to facilitate the start of the ra-ContentionResolutionTimer for receipt of MSG4, and the additional timer may be started after the initial transmission of MSG3. In addition, the network provides assistance information about blind retransmission of MSG3.

The operations performed at 431 to 435 are similar to the operations performed at 421 to 425 in procedure 402. For the purpose of brevity, the descriptions of these operations are omitted. After the target offset 435, the first device 210 starts the ra-ContentionResolutionTimer During the ra-ContentionResolutionTimer is running, the first device 210 receives DCI for scheduling grant for blind retransmission of MSG3 at 436, and the first device 210 may retransmit MSG3 with blind retransmission at 437, while terminate the ra-ContentionResolutionTimer.

Additionally, upon receipt of the DCI, the first device 210 may determine whether the DCI is corresponding to the last scheduling for MSG3 based on the assistance information provided by the second device 220. The assistance information may be, for example, the maximum number of blind retransmission of MSG3, or an indicator of the last scheduling for MSG3.

By way of example, the second device 220 may preconfigure the maximum number of blind retransmission of MSG3 to the first device 210. If the retransmission of MSG3 scheduled by the DCI is the maximum number of blind retransmission, the first device 210 may determine that the DCI is corresponding to the last scheduling for MSG3. Otherwise, if the retransmission of MSG3 scheduled by the DCI is not the maximum number of blind retransmission, the first device 210 may determine that the DCI is not corresponding to the last scheduling for MSG3. In this way, the first device 210 may determine whether it is the last transmission of MSG3 based on the number of the retransmission.

As an alternative, the second device 220 may provide an indication for the last scheduling (e.g., one indicator) to first device 210. For example, the indication may be contained in DCI for scheduling grant for the retransmission of MSG3, and so on. In this way, the first device 210 may determine whether it is the last transmission of MSG3 based on the indicator.

Since the first device 210 knows that there is no further DCI for the retransmission of MSG3, the first device 210 has no need to wait for expiration of the ra-ContentionResolutionTimer. After the retransmission of MSG3 at 437, the first device 210 starts the ra-ContentionResolutionTimer after a duration 438 of a time difference between the gNB-UE RTT and the running time of the additional timer. During the running of the ra-ContentionResolutionTimer, the first device 210 may receive MSG4 from the second device 220.

Figure 4D:
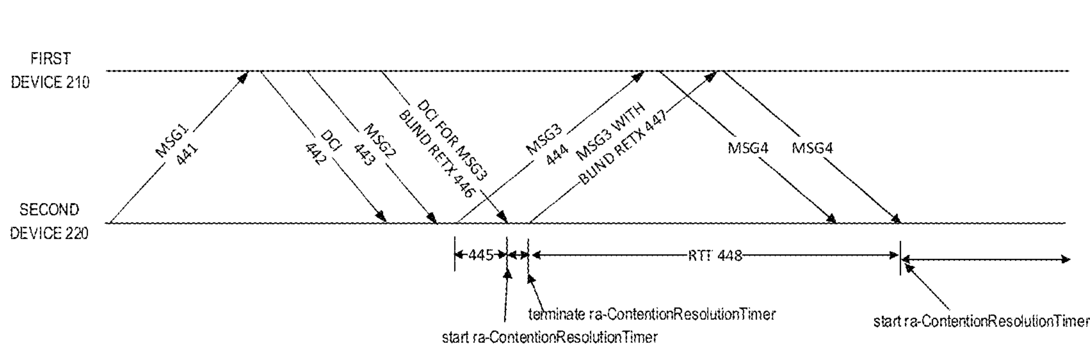

As previously mentioned, for the case that the network only configures one offset to the UE, if the gNB-UE RTT is large, e.g., the RTT may be 540 ms for GEO case, the ra-ContentionResolutionTimer needs to be configured with a large value for receipt of MSG4. For the case of a small offset, it will cause more power consumption. To further reduce the power consumption at UE, the contention resolution procedure may be improved, which will be discussed in conjunction with FIG. 4D. FIG. 4D illustrates an example contention resolution procedure 404 for the NTN according to some example embodiments of the present disclosure. In the procedure 404, the second device 220 may either configure a single offset or configure a set of candidate offsets, and the first device 210 determines the target offset accordingly. In addition, the network provides assistance information about blind retransmission of MSG3. The assistance information may be, for example, the maximum number of blind retransmission of MSG3, or an indicator of the last scheduling for MSG3.

The operations performed at 441 to 445 are similar to the operations performed at 421 to 425 in procedure 402. For the purpose of brevity, the descriptions of these operations are omitted. After the target offset 445, the first device 210 starts the ra-ContentionResolutionTimer During the ra-ContentionResolutionTimer is running, the first device 210 receives DCI for scheduling grant for blind retransmission of MSG3 at 446, and the first device 210 may retransmit MSG3 with blind retransmission at 447, while terminate the ra-ContentionResolutionTimer.

With the assistance information, the UE can know there will be no further blind retransmission of MSG3, and thus there is no need to receive DCI anymore. In this case, after the retransmission of MSG3 447, the first device 210 can start the ra-ContentionResolutionTimer after the RTT 448 instead of the target offset. Considering that the ra-ContentionResolutionTimer may be started late due to the RTT, the solution with the additional timer as described in connection with FIG. 4C further improves the solution described in connection with FIG. 4D, especially in terms of delay and communication quality.

It should be understood that the number of retransmissions shown in FIGS. 4A to 4D is given only for illustrative purpose. Depending on the communication scenario, configuration, etc., there may or may not be one or more retransmission of the message between the initial transmission and the last scheduling of MSG3. For example, in some cases, the last scheduling of MSG3 is the only scheduling of retransmission of MSG3. For brevity of the description, this is not discussed in detail herein.

According to the example embodiments of the present disclosure, there is provided a solution of enhanced blind retransmission. With the solution, blind retransmission of MSG3 can be supported in NTN. In addition, the start and termination of the ra-ContentionResolutionTimer can be controlled based on the offset configured or indicated from the network. Therefore, the solution can realize a trade-off between power consumption and communication delay.

Figure 5:
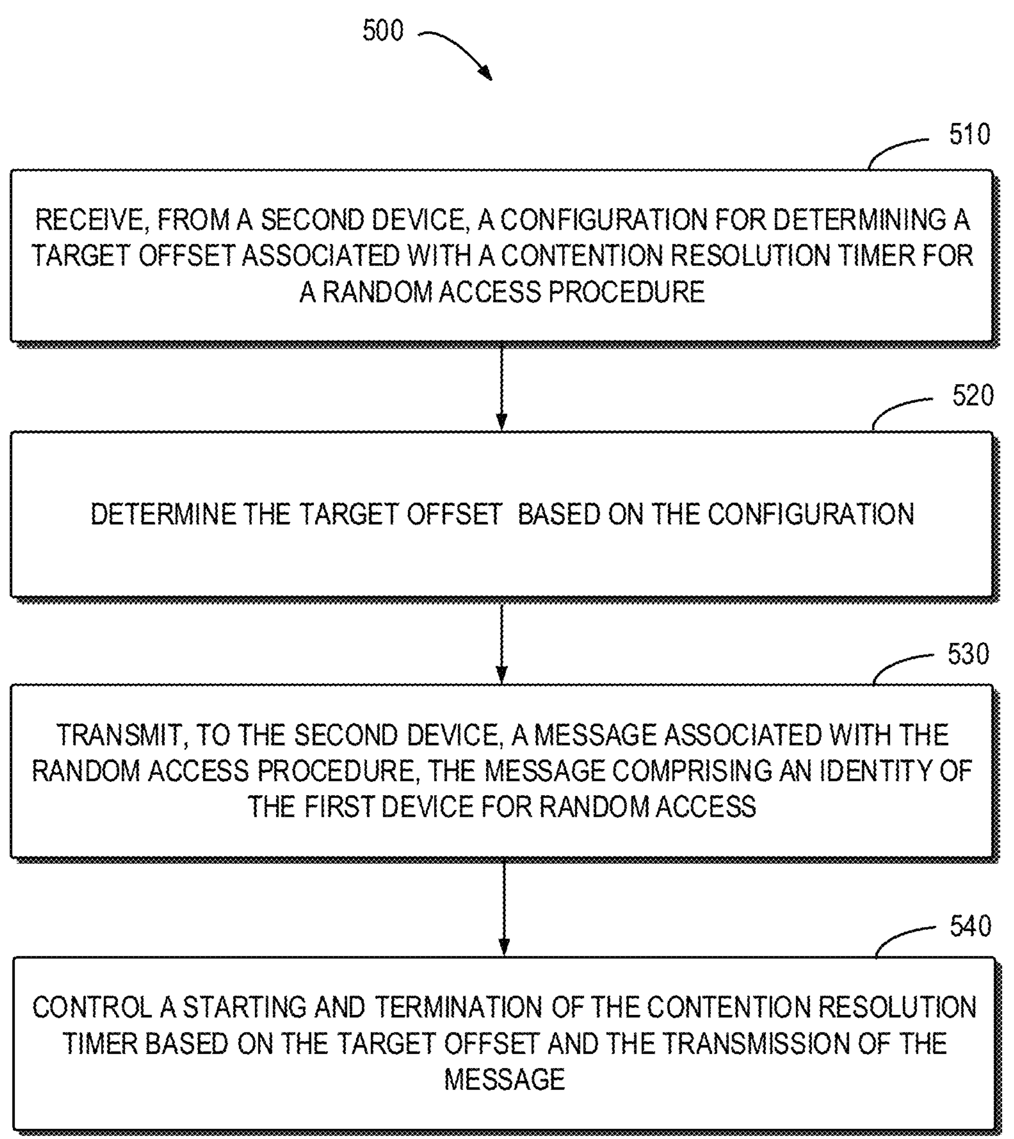
FIG. 5 shows a flowchart of an example method of random access according to some example embodiments of the present disclosure.

FIG. 5 shows a flowchart of an example method 500 of random access according to some example embodiments of the present disclosure. The method 400 can be implemented at the first device 210 as shown in FIG. 2. For the purpose of discussion, the method 500 will be described with reference to FIG. 2.

At 510, the first device 210 receives, from the second device 220, a configuration for determining a target offset associated with a contention resolution timer for a random access procedure.

In some example embodiments, the configuration may include the target offset, or a set of candidate offsets. The configuration may be contained in a RRC message or system information block, SIB, signaling received from the second device 220.

At 520, the first device 210 determines the target offset based on the configuration.

At 530, the first device 210 transmits, to the second device 220, a message associated with the random access procedure, the message comprising an identity of the first device for random access. The message may be the Message 3 in the random access procedure.

In the embodiments where the configuration comprises the set of candidate offsets, the first device 210 may receive an indication of an offset index from the second device 220. The offset index may be associated with an actual offset value of the target offset. The first device 210 may determine the target offset from the set of candidate offsets based on the offset index.

In some example embodiments, the indication may be contained in one of the following: a RAR for scheduling an initial transmission of the message, the DCI for scheduling grant for the RAR, the DCI for scheduling grant for a retransmission of the message and so on.

At 540, the first device 210 control a starting and termination of the contention resolution timer based on the target offset and the transmission of the message.

In some example embodiments, the first device 210 may receive, from the second device 220, a RAR for scheduling the transmission of the message, or the DCI for scheduling grant for the RAR. The first device 210 may start the contention resolution timer after the target offset from the transmission of the message. The transmission of the message may be the initial transmission of MSG3.

In some example embodiments, the first device 210 may receive, from the second device 220, the DCI for scheduling grant for a retransmission of the message. The first device 210 may retransmit the message to the second device 220, while terminate a running contention resolution time.

Additionally, in the case where the retransmission of the message is scheduled by the DCI, the first device 210 may then start a new contention resolution timer after the target offset from the retransmission of the message.

In the above embodiments, upon an initial transmission of the message, the first device 210 may start an additional timer. The duration of the additional timer may be, for example, less than the RTT associated with the first device 210 and the second device 220. The duration of the additional timer may be configured by the second device 220 or specified in advance. If the first device 210 determines that no further DCI is received from the second device 220 until the contention resolution timer expires, the first device 210 may terminate the additional timer upon the contention resolution timer expires. The first device 210 may then start the contention resolution timer after a time period with a duration of a time difference between the RTT and a running time of the additional timer before being terminated.

Alternatively, in the above embodiments, upon an initial transmission of the message, the first device 210 may start an additional timer. The first device 210 may determine whether the DCI is corresponding to the last scheduling for the message.

By way of example, the first device 210 may determine whether the DCI is corresponding to the last scheduling for the message based on the maximum number of blind retransmission for the message preconfigured by the second device 220. If the retransmission is the maximum number of blind retransmission, the DCI is determined to be corresponding to the last scheduling. Otherwise, if the retransmission is not the maximum number of blind retransmission, the DCI is determined to be not corresponding to the last scheduling.

By way of another example, the first device 210 may determine whether the DCI is corresponding to the last scheduling for the message based on an indication for the last scheduling from the second device 220. The indication may be contained in the DCI for scheduling grant for the retransmission of the message.

If the DCI is corresponding to the last scheduling for the message, the first device 210 may terminate the additional timer. The first device 210 may then start the contention resolution timer after a time period with a duration of a time difference between the RTT and a running time of the additional timer before being terminated. Otherwise, if the DCI is not corresponding to the last scheduling for the message, the first device 210 may start the contention resolution timer after the target offset from the retransmission of the message.

It should be understood that there may or may not be one or more retransmission of the message between the initial transmission and the last scheduling of the message. For brevity of the description, this is not discussed in detail herein.

In some example embodiments, the first device 210 may comprise a terminal device, such as, a UE, and the second device 220 may comprise a network device, such as, a gNB.

According to the example embodiments of the present disclosure, an offset is introduced for the ra-ContentionResolutionTimer. With the offset, the blind retransmission of MSG3 can be supported in NTN. In addition, the start and termination of the ra-ContentionResolutionTimer can be controlled by the UE based on the gNB's configuration. In this way, a trade-off between power consumption and communication delay of signalling in the RA procedure can be realized.

Figure 6:
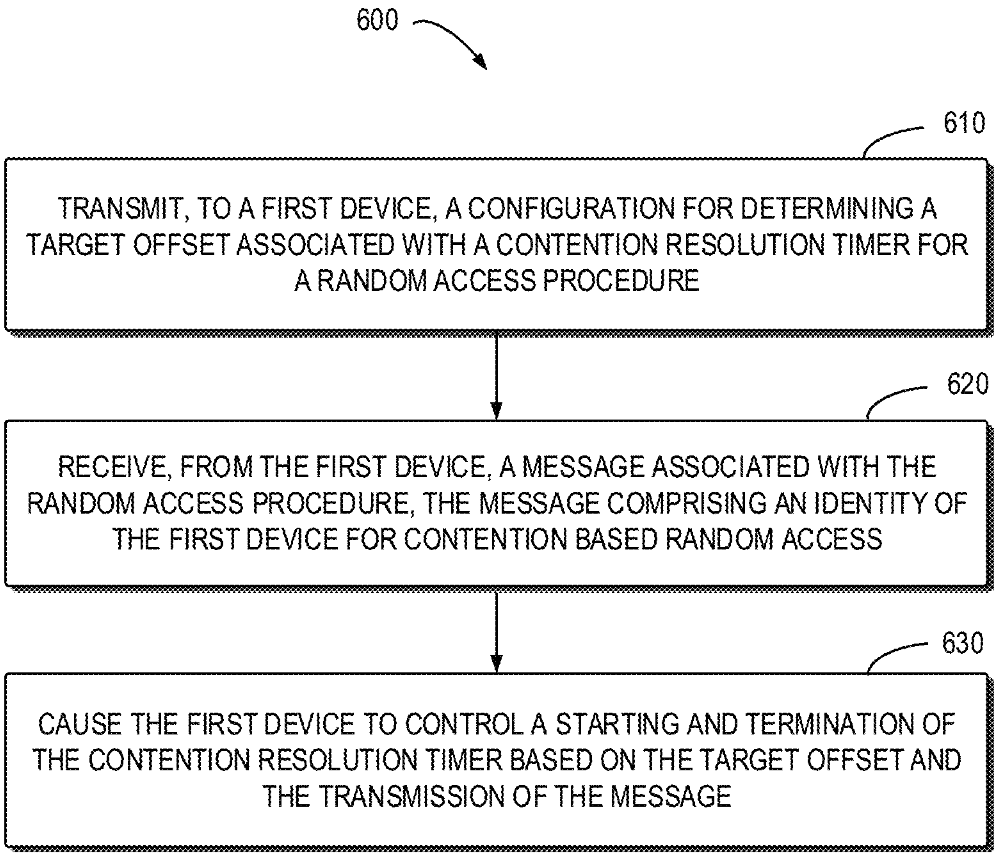
FIG. 6 shows a flowchart of an example method of random access according to some example embodiments of the present disclosure.

FIG. 6 shows a flowchart of an example method 600 of random access according to some example embodiments of the present disclosure. The method 600 can be implemented at the second device 220 as shown in FIG. 2. For the purpose of discussion, the method 600 will be described with reference to FIG. 2.

At 610, the second device 220 transmits, to the first device 210, a configuration for determining a target offset associated with a contention resolution timer for a random access procedure.

By way of example, the configuration may comprise the target offset, and may be contained in a RRC message or a SIB signaling transmitted to the first device 210.

By way of another example, the configuration may comprise a set of candidate offsets, and may be contained in the RRC message or the SIB signaling. In this case, the second device 220 may transmit, to the first device 210, an indication of an offset index for determining the target offset from the set of candidate offsets. The indication may be contained in one of the following: a RAR for scheduling an initial transmission of the message, the DCI for scheduling grant for the RAR, the DCI for scheduling grant for a retransmission of the message and so on.

At 620, the second device 220 receives, from the first device 210, a message associated with the random access procedure. The message may comprise an identity of the first device 210 for contention based random access. For example, the message may be the Message 3 in the random access procedure.

At 630, the second device 220 causes the first device 210 to control a starting and termination of the contention resolution timer based on the target offset and the transmission of the message.

In some example embodiments, the second device 220 may transmit, to the first device 210, DCI for scheduling grant for blind retransmission of the message in the contention resolution timer.

In some example embodiments, the second device 220 may transmit a configuration of the maximum number of blind retransmission of the message to the first device 210. The second device 220 may transmit, to the first device 210, the DCI for scheduling grant for the maximum number of blind retransmission of the message. The second device 220 may then receive, from the first device 210, the retransmission of the message.

In some example embodiments, the second device 220 may transmit, to the first device 210, DCI for scheduling grant for a retransmission of the message along with an indication of the DCI corresponding to the last scheduling for the message. The indication may be contained in one of the following: a RAR for scheduling an initial transmission of the message, the DCI for scheduling grant for the RAR, the DCI for scheduling grant for a retransmission of the message and so on.

In some example embodiments, the second device 220 may transmit, to the first device 210, one of a RAR for scheduling an initial transmission of the message, the DCI for scheduling grant for the RAR, the DCI for scheduling grant for a retransmission of the message and so on. The second device 220 may cause the first device 210 to start the contention resolution timer after the target offset from the transmission of the message.

In the above embodiments, the second device 220 may cause the first device 210 to control the termination of the contention resolution timer in the following manner. The second device 220 transmits, to the first device 210, DCI for scheduling grant for a retransmission of the message. The second device 220 then receives, from the first device 210, the retransmission of the message. The second device 220 causes the first device 210 to terminate the contention resolution timer from the retransmission of the message.

The second device 220 may further cause the first device 210 to start an additional timer upon an initial transmission of the message. The first device 210 is caused to terminate the additional timer upon the contention resolution timer expires, and start the contention resolution timer after a time period with a duration of a time difference between the RTT and a running time of the additional timer before being terminated.

The second device 220 may further cause the first device 210 to start an additional timer upon an initial transmission of the message. The first device 210 is caused to determine whether the DCI is corresponding to the last scheduling for the message based on one of the maximum number of blind retransmission for the message preconfigured by the second device 220 or an indication for the last scheduling from the second device 220. If the DCI is corresponding to the last scheduling for the message, the first device 210 is caused to terminate the additional timer. The first device 210 is then caused to start the contention resolution timer after a time period with a duration of a time difference between the RTT and a running time of the additional timer before being terminated.

In some example embodiments, the first device 210 may comprise a terminal device, such as, a UE, and the second device 220 may comprise a network device, such as, a gNB.

In some example embodiments, a first apparatus capable of performing the method 500 (for example, implemented at the first device 210) may comprise means for performing the respective steps of the method 500. The means may be implemented in any suitable form. For example, the means may be implemented in a circuitry or software module.

In some example embodiments, the first apparatus comprises: means for receiving, from a second apparatus, a configuration for determining a target offset associated with a contention resolution timer for a random access procedure; means for determining the target offset based on the configuration; means for means for transmitting, to the second apparatus, a message associated with the random access procedure, the message comprising an identity of the first apparatus for random access; and means for means for controlling a starting and termination of the contention resolution timer based on the target offset and the transmission of the message.

In some example embodiments, the configuration comprises one of the target offset and a set of candidate offsets, and the configuration is contained in a RRC message or system information block, SIB, signaling received from the second apparatus.

In some example embodiments, the configuration comprises the set of candidate offsets, and the means for determining the target offset comprises: means for receiving, from the second apparatus, an indication of an offset index; and means for determining the target offset from the set of candidate offsets based on the offset index.

In some example embodiments, the indication is contained in one of the following: a random access response, RAR, for scheduling an initial transmission of the message, downlink control information, DCI, for scheduling grant for the RAR, or DCI for scheduling grant for a retransmission of the message.

In some example embodiments, the means for controlling the starting of the contention resolution timer comprises: means for receiving, from the second apparatus, one of a random access response, RAR, for scheduling the transmission of the message, or downlink control information, DCI, for scheduling grant for the RAR; and means for starting the contention resolution timer after the target offset from the transmission of the message.

In some example embodiments, the means for controlling the termination of the contention resolution timer: means for receiving, from the second apparatus, DCI for scheduling grant for a retransmission of the message; and means for retransmitting the message to the second apparatus, while terminating a running contention resolution timer.

In some example embodiments, the first apparatus further comprises: means for starting a new contention resolution timer after the target offset from the retransmission of the message.

In some example embodiments, the first apparatus further comprises: means for upon an initial transmission of the message, starting an additional timer; means for in accordance with a determination that no further DCI is received from the second apparatus until the contention resolution timer expires, terminating the additional timer upon the contention resolution timer expires; means for starting the contention resolution timer after a time period with a duration of a time difference between the round trip time and a running time of the additional timer before being terminated.

In some example embodiments, the first apparatus further comprises: means for upon an initial transmission of the message, starting an additional timer; means for in accordance with a determination that the DCI is corresponding to the last scheduling for the message, terminating the additional timer; and means for starting the contention resolution timer after a time period with a duration of a time difference between the round trip time and a running time of the additional timer before being terminated.

In some example embodiments, the first apparatus further comprises: means for in accordance with a determination that the DCI is not corresponding to the last scheduling for the message, starting the contention resolution timer after the target offset from the retransmission of the message.

In some example embodiments, the first apparatus further comprises: means for determining whether the DCI is corresponding to the last scheduling for the message based on the maximum number of blind retransmission for the message preconfigured by the second apparatus; means for in accordance with a determination that the retransmission is the maximum number of blind retransmission, determining that the DCI is corresponding to the last scheduling; and means for in accordance with a determination that the retransmission is not the maximum number of blind retransmission, determining that the DCI is not corresponding to the last scheduling.

In some example embodiments, the first apparatus further comprises: means for determining whether the DCI is corresponding to the last scheduling for the message based on an indication for the last scheduling from the second apparatus, the indication being contained in DCI for scheduling grant for the retransmission of the message.

In some example embodiments, the message is a Message 3 in the random access procedure.

In some example embodiments, the first apparatus comprises a terminal device, and a second apparatus comprises a network device.

In some example embodiments, a second apparatus capable of performing the method 600 (for example, implemented at the second device 220) may comprise means for performing the respective steps of the method 600. The means may be implemented in any suitable form. For example, the means may be implemented in a circuitry or software module.

In some example embodiments, the second apparatus comprises: means for transmitting, to a first apparatus, a configuration for determining a target offset associated with a contention resolution timer for a random access procedure; means for receiving, from the first apparatus, a message associated with the random access procedure, the message comprising an identity of the first apparatus for contention based random access; and means for causing the first apparatus to control a starting and termination of the contention resolution timer based on the target offset and the transmission of the message.

In some example embodiments, the configuration comprises the target offset and is contained in a RRC message or a system information block, SIB, signaling transmitted to the first apparatus.

In some example embodiments, the second apparatus further comprises: means for transmitting, to the first apparatus, downlink control information, DCI, for scheduling grant for blind retransmission of the message in the contention resolution timer.

In some example embodiments, the configuration comprises a set of candidate offsets, and is contained in a RRC message or a system information block, SIB, signaling transmitted to the first apparatus, and the second apparatus further comprises: means for: transmitting, to the first apparatus, an indication of an offset index for determining the target offset from the set of candidate offsets.

In some example embodiments, the indication is contained in one of the following: a random access response, RAR, for scheduling an initial transmission of the message, downlink control information, DCI, for scheduling grant for the RAR, or DCI for scheduling grant for a retransmission of the message.

In some example embodiments, the second apparatus further comprises: means for transmitting, to the first apparatus, a configuration of the maximum number of blind retransmission of the message; means for transmitting, to the first apparatus, DCI for scheduling grant for the maximum number of blind retransmission of the message; and means for receiving, from the first apparatus, the retransmission of the message.

In some example embodiments, the second apparatus further comprises: means for transmitting, to the first apparatus, DCI for scheduling grant for a retransmission of the message along with an indication of the DCI corresponding to the last scheduling for the message, the indication being contained in DCI for scheduling grant for a retransmission of the message.

In some example embodiments, the means for causing the first apparatus to control the starting of the contention resolution timer comprises: means for transmitting, to the first apparatus, a random access response, RAR, for scheduling the transmission of the message, or downlink control information, DCI, for scheduling grant for the RAR; and means for causing the first apparatus to start the contention resolution timer after the target offset from the transmission of the message.

In some example embodiments, the means for causing the first apparatus to control the termination of the contention resolution timer comprises: means for transmitting, to the first apparatus, DCI for scheduling grant for a retransmission of the message; means for receiving, from the first apparatus, the retransmission of the message; and means for causing the first apparatus to terminate the contention resolution timer from the retransmission of the message.

In some example embodiments, the second apparatus further comprises means for causing the first apparatus to: start an additional timer upon an initial transmission of the message; terminate the additional timer upon the contention resolution timer expires; and start the contention resolution timer after a time period with a duration of a time difference between the round trip time and a running time of the additional timer before being terminated.

In some example embodiments, the second apparatus further comprises means for causing the first apparatus to: start an additional timer upon an initial transmission of the message; determine whether the DCI is corresponding to the last scheduling for the message based on one of the maximum number of blind retransmission for the message preconfigured by the second apparatus or an indication for the last scheduling from the second apparatus; in accordance with a determination that the DCI is corresponding to the last scheduling for the message, terminate the additional timer; and start the contention resolution timer after a time period with a duration of a time difference between the round trip time and a running time of the additional timer before being terminated.

In some example embodiments, the message is a Message 3 in the random access procedure.

In some example embodiments, the first apparatus comprises a terminal device, and a apparatus device comprises a network device.

Figure 7:
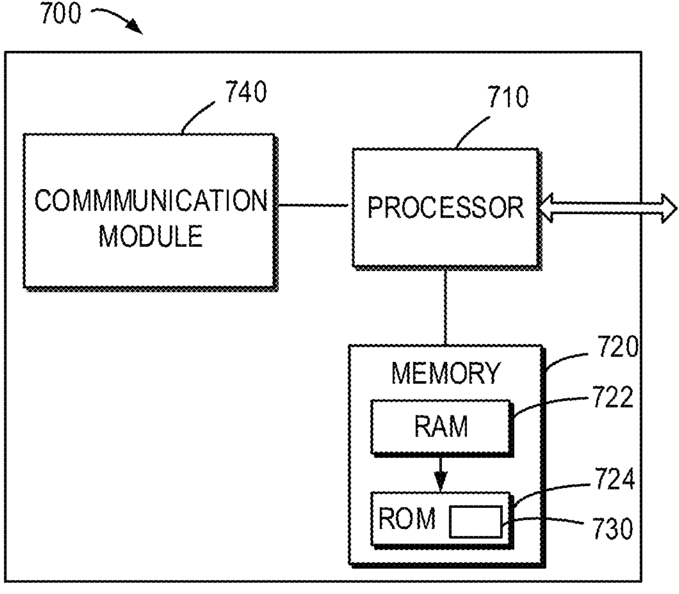
FIG. 7 shows a simplified block diagram of a device that is suitable for implementing example embodiments of the present disclosure.

FIG. 7 is a simplified block diagram of a device 700 that is suitable for implementing embodiments of the present disclosure. The device 700 may be provided to implement the communication device, for example the first device 210 and the second device 220 as shown in FIG. 2. As shown, the device 700 includes one or more processors 710, one or more memories 720 coupled to the processor 710, and one or more transmitters and/or receivers (TX/RX) 740 coupled to the processor 710.

The TX/RX 740 may be configured for bidirectional communications. The TX/RX 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage media. Examples of the volatile memories include, but are not limited to, a random access memory (RAM) 722 and other volatile memories that will not last in the power-down duration.

A computer program 730 includes computer executable instructions that may be executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIG. 3. The embodiments of the present disclosure may also be implemented by hardware or by a combination of software and hardware.

Figure 8:
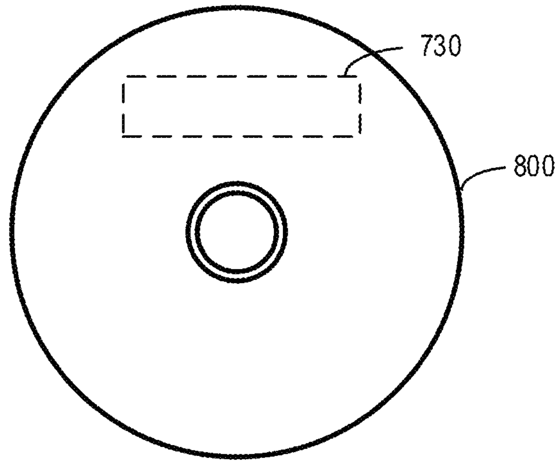
FIG. 8 shows a block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations. It is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 or 600 as described above with reference to FIGS. 5-6. Generally, program modules may include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:

a processor; and a memory including computer program codes configured to, with the processor, cause the first device at least to:

receive, from a second device, a configuration for determining a target offset associated with a contention resolution timer for a random access procedure;

determine the target offset based on the configuration;

transmit, to the second device, a message associated with the random access procedure, the message comprising an identity of the first device for random access;

upon the transmission of the message, start a first timer;

receive, from the second device, downlink control information (DCI) for scheduling grant for a random access response (RAR);

in accordance with a determination that the DCI corresponds to a last scheduling for the message, terminate the first timer;

start a contention resolution timer after the target offset from the transmission of the message and after a time period with a duration of a time difference between a round trip time and a running time of the first timer before the first timer is terminated;

while the contention resolution timer is running, receive, from the second device, the DCI for scheduling grant for a retransmission of the message; and execute a blind re-transmission of the message to the second device, while terminating the contention resolution timer; and re-start the contention resolution timer after the target offset from the blind re-transmission of the message and after the duration of the time difference between the round trip time and the running time of the first timer before being terminated; and while the contention resolution timer is running after being re-started, receive a second message from the second device.

2. The first device of claim 1, wherein the configuration comprises the target offset or a set of candidate offsets, and the configuration is contained in the RRC or system information block (SIB) signaling received from the second device.

3. The first device of claim 2, wherein the configuration comprises the set of candidate offsets, and wherein the memory and the computer program codes are configured to, with the processor, cause the first device to determine the target offset by:

receiving, from the second device, an indication of an offset index; and determining the target offset from the set of candidate offsets based on the offset index.

4. The first device of claim 3, wherein memory and the computer program codes are configured to, with the processor, further cause the first device to:

determine whether the DCI is corresponding to the last scheduling for the message based on f maximum number of blind retransmission for the message preconfigured by the second device;

in accordance with a determination that the retransmission is the maximum number of blind re-transmission, determine that the DCI is corresponding to the last scheduling; and in accordance with a determination that the retransmission is not the maximum number of blind re-transmission, determine that the DCI is not corresponding to the last scheduling.

5. The first device of claim 4, wherein the indication is contained in the RAR for scheduling an initial transmission of the message.

6. The first device of claim 4, wherein the indication is contained in the DCI for scheduling grant for the RAR.

7. The first device of claim 4, wherein the indication is contained in DCI for scheduling grant for a retransmission of the message.

8. A system comprising:

a first device;

a processor; and a memory comprising computer-executable instructions that, when executed by the processor, cause the processor to perform the following operations:

receive, from the second device, a configuration for determining a target offset associated with a contention resolution timer for a random access procedure;

determine the target offset based on the configuration;

transmit, to the second device, a message associated with the random access procedure, the message comprising an identity of the first device for random access;

upon the transmission of the message, start a first timer;

receiving, from the second device, downlink control information (DCI) for scheduling grant for a random access response (RAR);

in accordance with a determination that the DCI corresponds to a last scheduling for the message, terminate the first timer;

starting a contention resolution timer after the target offset from the transmission of the message and after a time period with a duration of a time difference between a round trip time and a running time of the first timer before the first timer is terminated;

while the contention resolution timer is running, receiving, from the second device, the DCI for scheduling grant for a retransmission of the message; and execute a blind re-transmission of the message to the second device, while terminating the contention resolution timer; and re-start the contention resolution timer after the target offset from the blind re-transmission of the message and after the duration of the time difference between the round trip time and the running time of the first timer before being terminated; and while the contention resolution timer is running after being re-started, receiving a second message from the second device.

9. The system of claim 8, wherein the configuration comprises the target offset or a set of candidate offsets, and the configuration is contained in the RRC or system information block (SIB) signaling received from the second device.

10. The system of claim 9, wherein the configuration comprises the set of candidate offsets, and wherein the computer-executable instruction further cause the processor to determine the target offset by:

receiving, from the second device, an indication of an offset index; and determining the target offset from the set of candidate offsets based on the offset index.

11. The system of claim 10, wherein the computer-executable instruction further cause the processor to:

determine whether the DCI is corresponding to the last scheduling for the message based on f maximum number of blind retransmission for the message preconfigured by the second device;

in accordance with a determination that the retransmission is the maximum number of blind re-transmission, determine that the DCI is corresponding to the last scheduling; and in accordance with a determination that the retransmission is not the maximum number of blind re-transmission, determine that the DCI is not corresponding to the last scheduling.

12. The system of claim 11, wherein the indication is contained in the RAR for scheduling an initial transmission of the message.

13. The system of claim 11, wherein the indication is contained in the DCI for scheduling grant for the RAR.

14. The system of claim 11, wherein the indication is contained in DCI for scheduling grant for a retransmission of the message.

15. A non-transitory computer-readable medium comprising computer-executable instructions that, when executed by a processor, cause the processor to perform the following operations:

receive, from the second device, a configuration for determining a target offset associated with a contention resolution timer for a random access procedure;

determine the target offset based on the configuration;

transmit, to the second device, a message associated with the random access procedure, the message comprising an identity of the first device for random access;

upon the transmission of the message, start a first timer;

receiving, from the second device, downlink control information (DCI) for scheduling grant for a random access response (RAR);

in accordance with a determination that the DCI corresponds to a last scheduling for the message, terminate the first timer;

starting a contention resolution timer after the target offset from the transmission of the message and after a time period with a duration of a time difference between a round trip time and a running time of the first timer before the first timer is terminated;

while the contention resolution timer is running, receiving, from the second device, the DCI for scheduling grant for a retransmission of the message; and execute a blind re-transmission of the message to the second device, while terminating the contention resolution timer; and re-start the contention resolution timer after the target offset from the blind re-transmission of the message and after the duration of the time difference between the round trip time and the running time of the first timer before being terminated; and while the contention resolution timer is running after being re-started, receiving a second message from the second device.

16. The non-transitory computer-readable medium of claim 15, wherein the configuration comprises the target offset or a set of candidate offsets, and the configuration is contained in the RRC or system information block (SIB) signaling received from the second device.

17. The non-transitory computer-readable medium of claim 16, wherein the configuration comprises the set of candidate offsets, and wherein the computer-executable instruction further cause the processor to determine the target offset by:

receiving, from the second device, an indication of an offset index; and determining the target offset from the set of candidate offsets based on the offset index.

18. The non-transitory computer-readable medium of claim 17, wherein the computer-executable instruction further cause the processor to:

determine whether the DCI is corresponding to the last scheduling for the message based on f maximum number of blind retransmission for the message preconfigured by the second device;

in accordance with a determination that the retransmission is the maximum number of blind re-transmission, determine that the DCI is corresponding to the last scheduling; and in accordance with a determination that the retransmission is not the maximum number of blind re-transmission, determine that the DCI is not corresponding to the last scheduling.

19. The non-transitory computer-readable medium of claim 18, wherein the indication is contained in the RAR for scheduling an initial transmission of the message.

20. The non-transitory computer-readable medium of claim 18, wherein the indication is contained in the DCI for scheduling grant for the RAR, or wherein the indication is contained in DCI for scheduling grant for a retransmission of the message.

* * * * *